(12) United States Patent
Ha

(10) Patent No.: US 6,352,265 B1
(45) Date of Patent: Mar. 5, 2002

(54) SEAL RING USING GAS CURTAIN

(75) Inventor: Tuan Thuc Ha, Dedham, MA (US)

(73) Assignee: Brooks Automation, Inc., Chelmsford, MA (US)

( * ) Notice: Subject to any disclaimer, the term of this patent is extended or adjusted under 35 U.S.C. 154(b) by 0 days.

(21) Appl. No.: 09/318,993

(22) Filed: May 26, 1999

(51) Int. Cl.$^7$ ............................................... F16J 15/40
(52) U.S. Cl. ........................ 277/432; 277/431; 277/347
(58) Field of Search ............................... 277/432, 431, 277/347, 459, 411, 412, 422

(56) References Cited

U.S. PATENT DOCUMENTS

| 4,471,964 A | 9/1984 | Kotzur | 277/431 X |
| 4,486,024 A | 12/1984 | Cooper | 277/431 X |
| 4,579,349 A | 4/1986 | Pipich et al. | 277/432 X |
| 4,815,748 A | 3/1989 | Schubert | 277/432 X |
| 6,070,881 A | 6/2000 | Longree | 277/411 X |

FOREIGN PATENT DOCUMENTS

| TW | 414276 | 12/2000 |

*Primary Examiner*—Lynne H. Browne
*Assistant Examiner*—John R. Cottingham
(74) *Attorney, Agent, or Firm*—Perman & Green, LLP

(57) ABSTRACT

A non contact isolation seal assembly for rotary and linear sealing for use in semiconductor manufacturing automation. The noncontact isolation seal assembly employs a seal having an aperture with a shaft extending through the aperture. A gap region is maintained between the outside surface of the shaft and the aperture of the seal. A gas source is connected to the interior of the gap region whereby gas pressure in the gap region is maintained at a higher pressure than gas pressure surrounding the shaft. The flow of gas and differential pressure prevents fluids, gasses, and contaminants from passing through the gap region preventing contamination of the drive mechanism.

20 Claims, 4 Drawing Sheets

SEAL RING USING GAS CURTAIN

BACKGROUND OF THE INVENTION

TECHNICAL FIELD

It is well known to use articulated arms to transport semiconductor wafers, plates and flat panel displays between cassettes, load locks, process modules and other work stations. Recent developments in the processing of semiconductors include the introduction of chemical metal polishing (CMP) and copper deposition whereby articulated arms can be exposed to fluids, corrosive liquids and corrosive gasses. These fluids, corrosive liquids and corrosive gasses can infiltrate the drive mechanism for the articulated arm causing premature failure of mechanical and electrical components due to contamination and corrosion. In the past, the drive mechanism has been sealed typically using bellows, lip seals, labarinth seals or ferro-fluid type seals; each of these sealing types has been effective but can be costly or also requiring high precision machining and alignment of sealing components.

The apparatus of the present invention relates generally to material transfer devices. The material transferred might include, but is not limited to semiconductor wafers, such as Silicon, Gallium Arsenide, semi conductor packing substrates, such as high density interconnects, semiconductor manufacturing process imaging plates, such as masks or reticles, and large area display panels, such as Active Matrix LCD substrates or Field Emission Diode substrates.

The invention further relates to robot drive technologies for handling wafers or flat panels and relates more particularly to improvements in such technologies whereby fluids, gasses, and contaminants can be isolated and excluded from the robot drive mechanism. The invention further relates to seals for rotating and/or reciprocating shafts and, more particularly, to low friction gas and liquid exclusion seals for rotating and/or reciprocating shafts.

SUMMARY OF THE INVENTION

The invention resides in a seal assembly for use in semiconductor manufacturing automation and more specifically relates to an improvement therefor whereby the robot drive mechanism can be sealed and isolated from fluids, gasses, and contaminants without the use of bellows, lip seals, labarinth seals or ferro-fluid type seals.

More specifically, the invention resides in a noncontact isolation seal assembly for rotary and linear sealing for use in semiconductor manufacturing automation. The noncontact isolation seal assembly comprises a seal having an aperture with a shaft extending through the aperture. A gap region is maintained between the outside surface of the shaft and the aperture of the seal. A gas source is connected to the interior of the gap region whereby gas pressure in the gap region is maintained at a higher pressure than gas pressure surrounding the shaft. The flow of gas and differential pressure prevents fluids, gasses, and contaminants from passing through the gap region preventing contamination of the drive mechanism.

DESCRIPTION OF THE DRAWINGS

The foregoing aspects and other features of the invention are explained in the following description taken in connection with the accompanying drawings, wherein.

DETAILED DESCRIPTION OF THE PREFERRED EMBODIMENT

Figure 1:
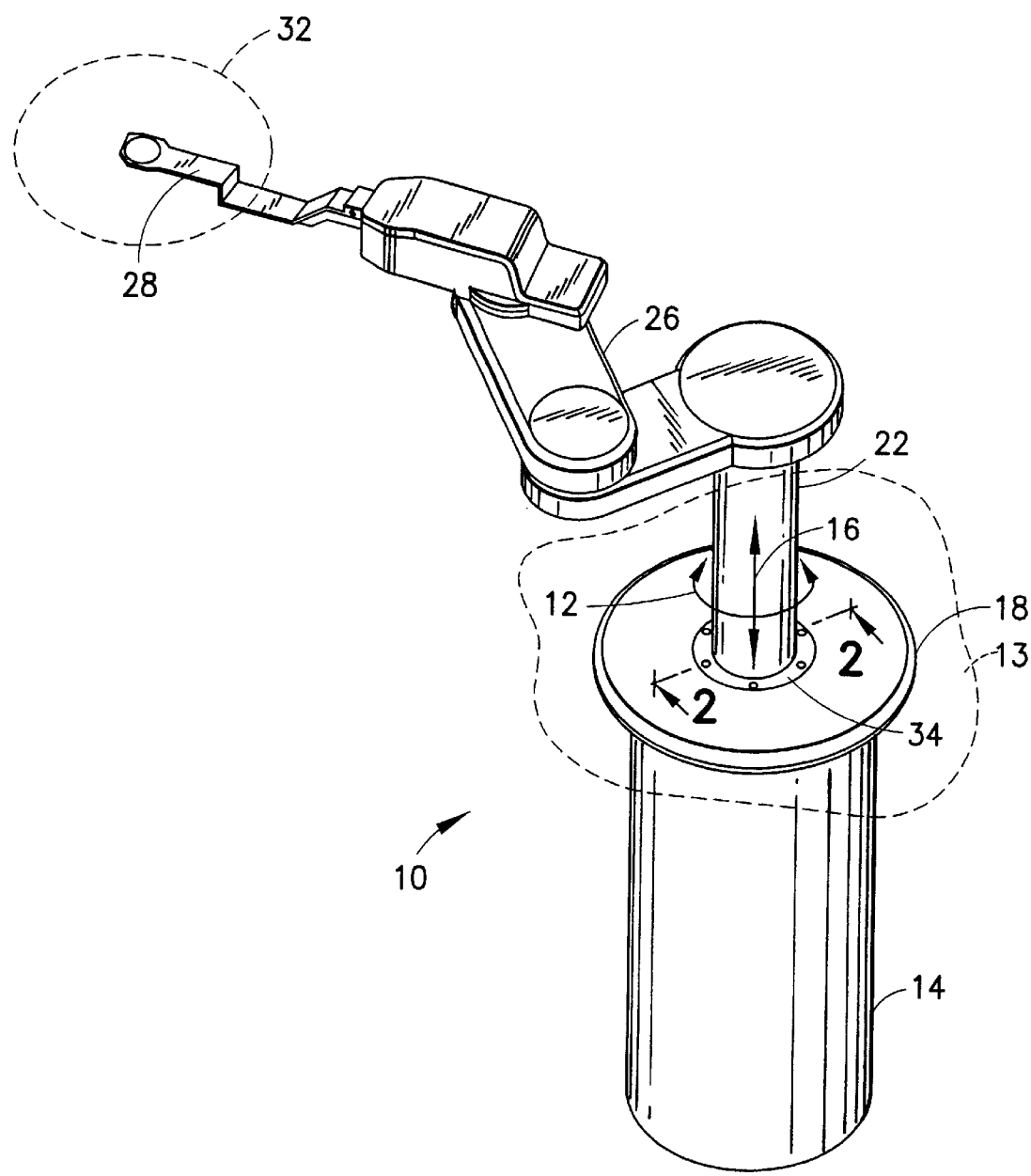
FIG. 1 is a perspective view of a substrate transfer apparatus incorporating features of the present invention.

Referring, now to FIG. 1, there is shown a perspective view of a substrate transfer apparatus 10. The substrate transfer apparatus 10 includes a drive housing 14, a drive shaft 22, driven arm 26 and mounting flange 18. Mounting flange 18 is fastened to work surface 13. Contaminants such as fluids, corrosive liquids and corrosive gasses are restricted to the side of work surface 13 and mounting flange 18 which driven arm 26 operates typically by static sealing mounting flange 18 to work surface 13 either by clamping, gasket or o-ring. Work surface 13 tends to act as a barrier to prevent contaminants such as fluids, corrosive liquids and corrosive gasses from exposing the exterior of drive housing 14 to such contaminants. The driven arm 26 includes an end effector 28 which may or may not utilize a vacuum grip when moving substrate 32. The drive shaft 22 may move in the vertical direction 16 and/or in the rotary direction 12 relative to drive housing 14. Seal Assembly 34 prevents contaminants such as fluids, corrosive liquids and corrosive gasses from passing from the side of work surface 13 and mounting flange 18 which driven arm 26 operates to the interior of drive housing 14 where the robot drive mechanism for driving driven arm 26 resides. Seal Assembly 34 also prevents contaminants such as particulates from passing from the interior of drive housing 14 to the side of work surface 13 and mounting flange 18 which driven arm 26 operates. A substrate processing apparatus such as disclosed in U.S. Pat. No. 5,270,600 is hereby incorporated by reference in its entirety. The substrate transfer apparatus 10 is adapted for use to process substrates and other articles of similar type, such as, semiconductor wafers or flat panel displays, as is known in the art. In alternative embodiments, other types of housings, flanges and/or arm assemblies could be used in conjunction with the present invention.

Figure 2:
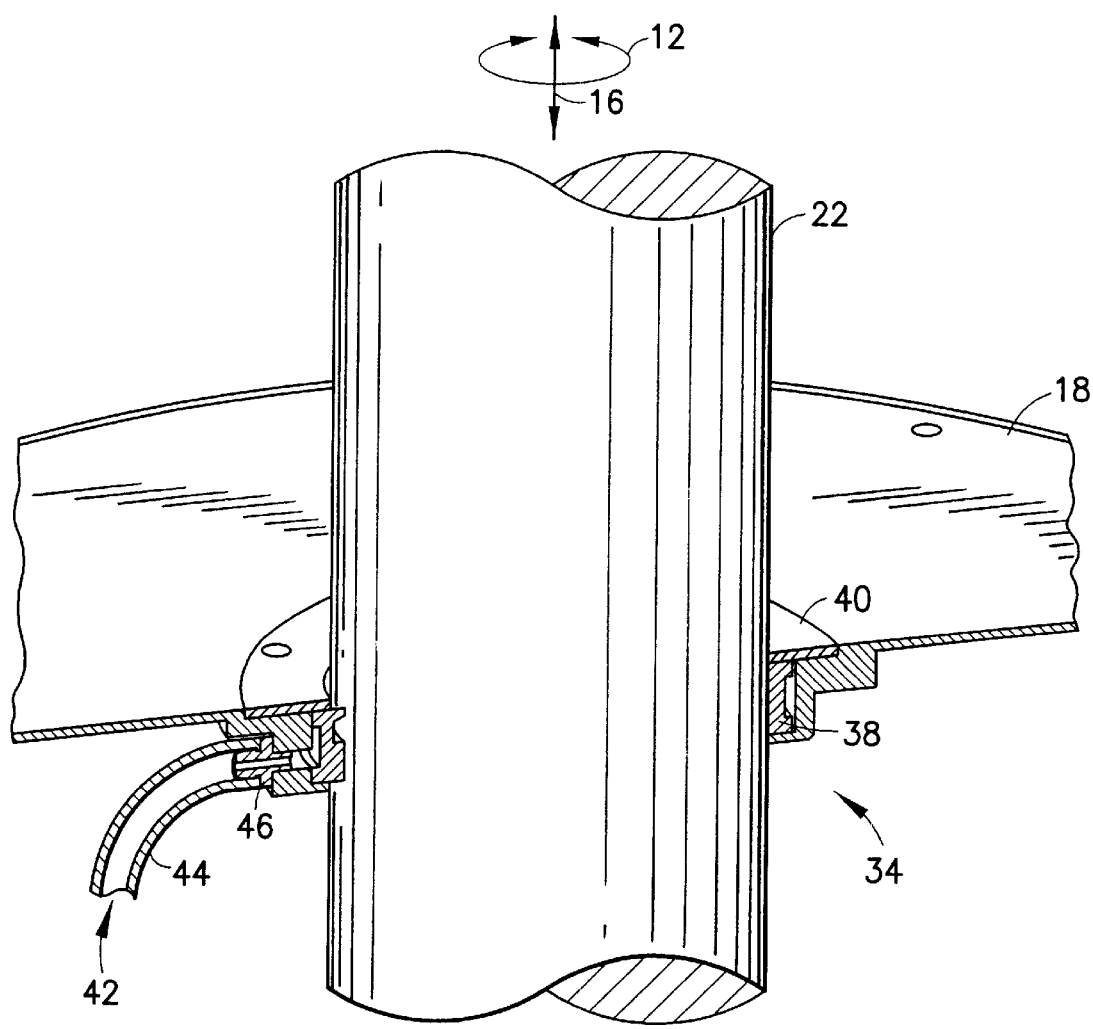
FIG. 2 is a isolated sectioned perspective view through the substrate transfer apparatus showing the seal assembly of the present invention.

Referring now to FIG. 2, there is shown an isolated sectioned perspective view through the substrate transfer apparatus. The seal assembly 34 includes a seal 38 in mounting flange 18 held in place either loosely or fixed by capture plate 40. Shaft 22 may move in the vertical direction 16 and/or in the rotary direction 12 relative to mounting flange 18. A gas source 42 is connected to mounting flange 18 with tubing 44 and fitting 46. The gas source can be compressed air, nitrogen, argon or other gas species compatible with the drive mechanism contained within drive housing 14 of FIG. 1.

Figure 3:
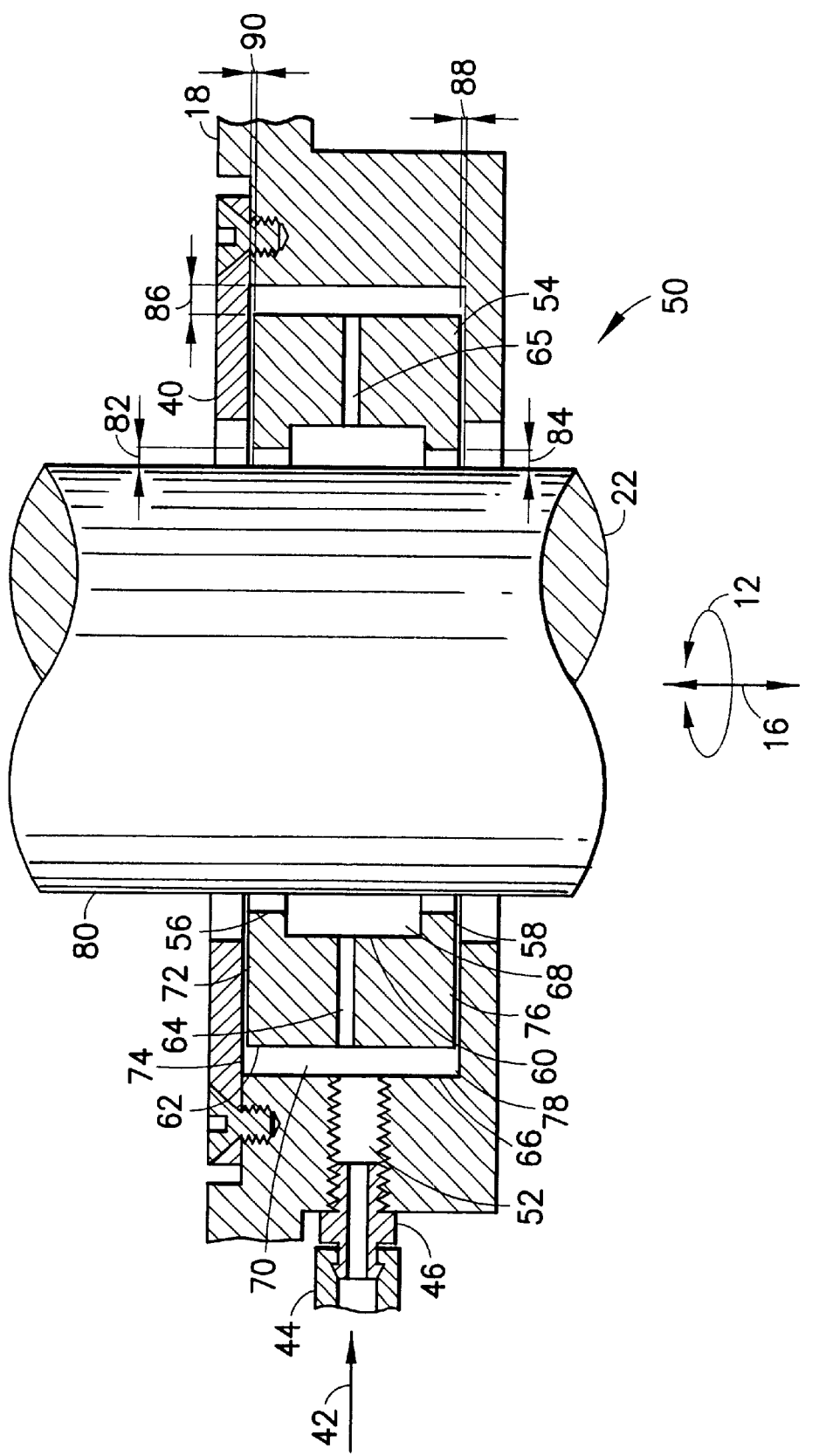
FIG. 3 is a isolated sectioned view of a first preferred embodiment of the present invention.

Referring now to FIG. 3, there is shown an isolated sectioned view of a first preferred embodiment of the present invention. The first preferred embodiment of the seal assembly 50 includes a seal 54 in mounting flange 18 held in place by capture plate 40. Shaft 22 may move in the vertical direction 16 and/or in the rotary direction 12 relative to mounting flange 18. Shaft 22 includes an outer surface 80 and can be made of aluminum, stainless steel or other suitable material. Mounting flange 18 includes a port 52, a lower seating surface 78 and an outer seating surface 66. Capture plate 40 includes an upper seating surface 74. Seal 54 includes a first sealing surface 56, a second sealing surface 58, recess 60, lower sealing surface 76, upper sealing surface 72, outside surface 62 and vents 64 and 65. Alternately, recess 60 can be eliminated effectively making first sealing surface 56 and second sealing surface 58 the same surface while still maintaining functionality of the seal assembly. Seal 54 can be made from a variety of metals, plastics or other suitable materials but is preferably machined from PVDF resin such as KYNAR. KYNAR is a registered trademark of PENNWALT CORPORATION for its polyvinylidene flouride resin.

Lower seal gap 88 is the space between lower sealing surface 76 and lower seating surface 78. Upper seal gap 90 is the space between upper seating surface 74 and upper sealing surface 72. Preferably the sum of lower sealing gap 88 and upper sealing gap 90 is maintained at between about 0.001 inches to 0.005 inches which allows seal ring 54 to float in mounting flange 18 such that seal 54 stays substantially concentric with shaft 22; however other distances could be provided and any range that works for the purpose intended is usable. This feature compensates for misalignment, eccentricity and deflection of shaft 22 relative to flange 18. Alternately, lower sealing gap 88 and upper sealing gap 90 can be zero or less effectively fixing seal 54 relative to flange 18; in this case shaft 22 must be precisely guided so as not to contact first sealing surface 56 and second sealing surface 58 of seal 54. Outer play gap 86 is the space between outside surface 62 and outer seating surface 66. Outer play gap is preferably maintained higher than the sum of expected values for misalignment, eccentricity and deflection of shaft 22 relative to flange 18 in order to prevent seal 54 from bottoming out on flange 18. Upper shaft seal gap 82 is the space between first sealing surface 56 and shaft 22. Lower shaft seal gap 84 is the space between second scaling surface 58 and shaft 22. Preferably, upper shaft seal gap 82 and Lower shaft seal gap 84 is maintained at between about 0.001 inches to 0.005 inches; however other distances could be provided and any range that works for the purpose intended is usable.

A gas source 42 is connected to mounting flange 18 with tubing 44 and fitting 46. The gas source can be compressed air, nitrogen, argon or other gas species compatible with the drive mechanism contained within drive housing 14 of FIG. 1. Gas pressure is preferably maintained between about five and ten pounds per square inch; however other pressure could be provided and any range that works for the purpose intended is usable. Gas is introduced into the seal assembly through port 52 in order to maintain outer pressurized region 70, vents 64, 65 and gap region 68 at a pressure preferably between about five and ten pounds per square inch; however other pressure could be provided and any range that works for the purpose intended is usable. Gas flows through Upper shaft seal gap 82, Lower shaft seal gap 84 at a higher rate than through Lower seal gap 88 and Upper seal gap 90 because of the higher clearance of Upper shaft seal gap 82 and Lower shaft seal gap 84 as well as the lower surface area of first sealing surface 56 and second sealing surface 58. The combination of gas pressure and gas flow prevents seal 54 from contacting shaft 22 while acting as a barrier to prevents fluids, gasses, and contaminants from passing by the seal assembly as previously set forth.

Figure 4:
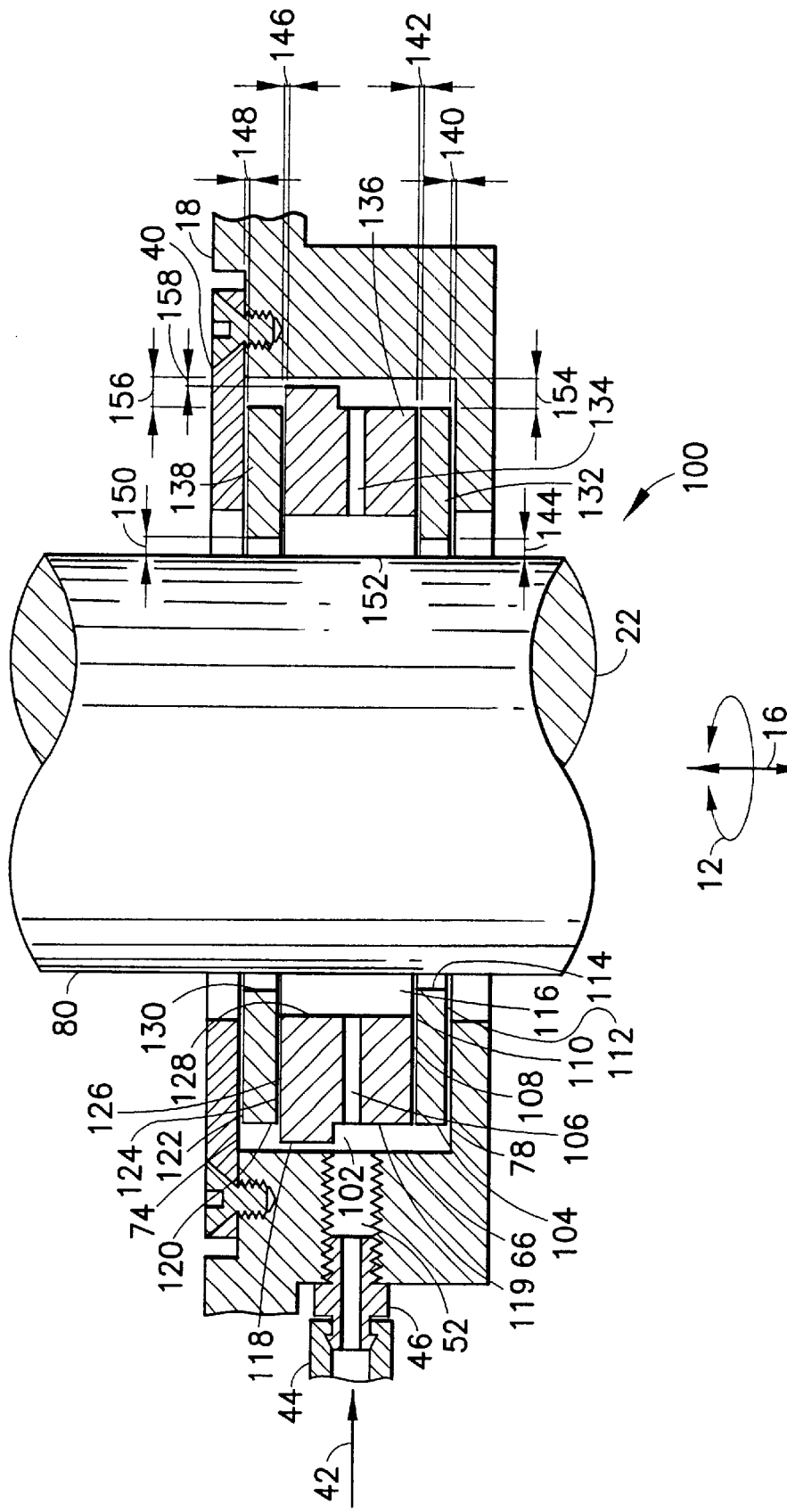
FIG. 4 is a isolated sectioned view of a second preferred embodiment of the present invention.

Referring now to FIG. 4, there is shown a isolated sectioned view of a second preferred embodiment of the present invention. The second preferred embodiment of the seal assembly 100 includes a first seal 138, a second seal 132 and a spacer 136 in mounting flange 18 held in place capture plate 40. Shaft 22 may move in the vertical direction 16 and/or in the rotary direction 12 relative to mounting flange 18. Shaft 22 includes an outer surface 80 and can be made of aluminum, stainless steel or other suitable material. Mounting flange 18 includes a port 52, a lower seating surface 78 and an outer seating surface 66. Capture plate 40 includes an upper seating surface 74. First seal 138 includes a first sealing surface 130, first lower surface 124, first upper sealing surface 122, and first outside surface 120. Second seal 132 includes a second sealing surface 114, second lower sealing surface 112, second upper surface 110, and second outside surface 104. Spacer 136 includes a spacer inner surface 128, spacer lower surface 108, spacer upper surface 126, spacer outside surface 118, backcut 119 and vents 106 and 134. First seal 138, second seal 132 and spacer 136 can be made from a variety of metals, plastics or other suitable materials but are preferably machined from PVDF resin such as KYNAR. KYNAR is a registered trademark of PENNWALT CORPORATION for its polyvinylidene flouride resin.

Lower seal gap 140 is the space between second lower sealing surface 112 and lower seating surface 78. Upper seal gap 148 is the space between upper seating surface 74 and first upper sealing surface 122. Lower spacer gap 142 is the space between second upper surface 110 and spacer lower surface 108. Upper spacer gap 146 is the space between first lower surface 124 and spacer upper surface 126. Preferably the sum of lower sealing gap 140, upper sealing gap 148, lower spacer gap 142 and upper spacer gap 146 is preferably maintained at between about 0.001 inches to 0.005 inches which allows first seal 138 and second seal 132 to float in mounting flange 18 such that first seal 138 and second seal 132 stay substantially concentric with shaft 22; however other distances could be provided and any range that works for the purpose intended is usable. This feature compensates for misalignment, eccentricity and deflection of shaft 22 relative to flange 18. First outer play gap 156 is the space between first outside surface 120 and outer seating surface 66. First outer play gap is preferably maintained higher than the sum of expected values for misalignment, eccentricity and deflection of shaft 22 relative to flange 18 in order to prevent first seal 138 from bottoming out on flange 18. Second outer play gap 154 is the space between second outside surface 104 and outer seating surface 66. Second outer play gap is preferably maintained higher than the sum of expected values for misalignment, eccentricity and deflection of shaft 22 relative to flange 18 in order to prevent second seal 132 from bottoming out on flange 18. Outer spacer gap 158 is the space between spacer outer surface 118 and outer seating surface 66. Preferably outer spacer gap 158 is preferably maintained between about 0.0005 and 0.001 inches; however other distances could be provided and any range that works for the purpose intended is usable. Inner spacer gap 152 is the space between outer surface 80 of shaft 22 and spacer inner surface 128. Inner spacer gap 152 is preferably maintained higher than the sum of expected values for misalignment, eccentricity and deflection of shaft 22 relative to flange 18 in order to prevent shaft 22 from contacting spacer 136. Upper shaft seal gap 150 is the space between first sealing surface 130 and shaft 22. Lower shaft seal gap 144 is the space between second sealing surface 114 and shaft 22. Preferably upper shaft seal gap 150 and Lower shaft seal gap 144 is preferably maintained at between about 0.001 inches to 0.005 inches; however other distances could be provided and any range that works for the purpose intended is usable.

A gas source 42 is connected to mounting flange 18 with tubing 44 and fitting 46. The gas source can be compressed air, nitrogen, argon or other gas species compatible with the drive mechanism contained within drive housing 14 of FIG. 1. Gas pressure is preferably maintained between about five and ten pounds per square inch; however other pressure could be provided and any range that works for the purpose intended is usable. Gas is introduced into the seal assembly through port 52 in order to maintain outer pressurized region 102, vents 106, 134 and gap region 116 at a pressure preferably between about five and ten pounds per square inch; however other pressure could be provided and any range that works for the purpose intended is usable. Gas flows through Upper shaft seal gap 150, Lower shaft seal gap 144 at a higher rate than through lower seal gap 140 and upper seal gap 148 because of the higher clearance of Upper shaft seal gap 150 and Lower shaft seal gap 144 as well as the lower surface area of first sealing surface 130 and second sealing surface 114. The combination of gas pressure and gas flow prevents first seal ring 138 and second seal ring 132 from contacting shaft 22 while acting as a barrier to prevents fluids, gasses, and contaminants from passing by the seal assembly as previously set forth.

While the present invention has been particularly described with respect to certain elements in its preferred embodiment, it will be understood that the invention is not limited to these particular methods and/or apparatus described in the preferred embodiments, the process steps, the sequence or the final structures depicted in the drawings. On the contrary, it is intended to cover all alternatives, modifications, and equivalents as may be included within the spirit and scope of the invention defined by the appended claims. In addition, other methods and or devices may be employed in the apparatus of the instant invention.

What is claimed is:

1. A semiconductor processing device noncontact isolation sealing assembly comprising:
   a seal having an aperture;
   a shaft having an outside surface, said shalt extending through said aperture of said seal;
   a gap region between said outside surface of said shaft and said aperture of said seal;
   a gas source connected to the interior of said gap region;
   wherein gas pressure in said gap region is maintained at a higher pressure than gas pressure surrounding said shaft and said seal, and wherein gas pressure surrounding said shaft is substantially at atmospheric pressure.

2. The noncontact isolation sealing assembly of claim 1 wherein said outside surface of said shaft is tubular in shape.

3. The noncontact isolation sealing assembly of claim 2 wherein said aperture of said seal comprises:
   a first sealing surface opposing said outside surface of said shaft;
   a second sealing surface opposing said outside surface of said shaft;
   a recess disposed between said first sealing surface and said second sealing surface.

4. The noncontact isolation sealing assembly of claim 3 wherein the radial distance between said recess and said outside surface of said shaft is greater than the radial distance between said first and said second sealing surfaces and said outside surface of said shaft.

5. The noncontact isolation sealing assembly of claim 1 wherein said aperture of said seal further comprises an inside diameter.

6. The noncontact isolation sealing assembly of claim 5 wherein the radial distance between said inside diameter of said aperature and said outside surface of said shaft is less than 0.005 inches when said inside diameter of said aperature is concentric with said shaft.

7. The noncontact isolation sealing assembly of claim 1 wherein gas pressure in said gap region is maintained less than 10 pounds per square inch higher than gas pressure surrounding said shaft and said seal.

8. A substrate transfer apparatus for use in semiconductor manufacturing equipment automation, said substrate transfer apparatus comprising:
   a drive housing having a seal, said seal having an aperture;
   a drive coupled to said drive housing;
   a shaft coupled to said drive, said shaft having an outside surface, said shaft extending through said aperture of said seal;
   an arm coupled to said shaft, said arm adapted to support a substrate;
   a gap region between said outside surface of said shaft and said aperture of said drive housing;
   a gas source connected to the interior of said gap region;
   wherein gas pressure in said gap region is maintained at a higher pressure than gas pressure surrounding said shaft and said drive housing, and wherein gas pressure surrounding said shaft and said drive housing is substantially at atmospheric pressure.

9. The substrate transfer apparatus of claim 8 wherein said outside surface of said shaft is tubular in shape.

10. The substrate transfer apparatus of claim 9 wherein said aperture of said seal comprises:
    a first sealing surface opposing said outside surface of said shaft;
    a second sealing surface opposing said outside surface of said shaft;
    a recess disposed between said first sealing surface and said second sealing surface.

11. The substrate transfer apparatus of claim 10 wherein the radial distance between said recess and said outside surface of said shaft is greater than the radial distance between said first and second sealing surfaces and said outside surface of said shaft.

12. The substrate transfer apparatus of claim 8 wherein said aperture of said drive housing further comprises an inside diameter.

13. The substrate transfer apparatus of claim 12 wherein the radial distance between said inside diameter of said aperature and said outside surface of said shaft is less than 0.005 inches when said inside diameter of said aperature is concentric with said shaft concentric.

14. The substrate transfer apparatus of claim 8 wherein gas pressure in said gap region is maintained less than 10 pounds per sq inch higher than gas pressure surrounding said shaft and said seal.

15. A noncontact isolation sealing assembly for rotary and linear sealing in semiconductor manufacturing automation, said noncontact isolation seal assembly comprising:
    a first seal having a first aperture;
    a second seal having a second aperture;
    a spacer having a third aperture disposed between said first and second seal;
    a shaft having an outside surface, said shaft extending through said first and second aperture of said first and second seal, said shaft extending through said third aperture of said spacer, said shaft axially movable relative to said first and second seal;
    a gap region between said outside surface of said shaft and said first and second aperture of said first and scold seal and said third aperture of said spacer;

a gas source connected to the interior of said gap region;

wherein gas pressure in said region is maintained at a higher pressure than gas pressure surrounding said shaft.

16. The noncontact isolation sealing assembly of claim 15 wherein:

said outside surface of said shaft is tubular in shape;

said first aperture of said first seal comprises a first sealing surface opposing said outside surface of said shaft;

said second aperture of said second seal comprises a second sealing surface opposing said outside surface of said shaft;

said third aperature of said spacer forms a recess disposed between said first sealing surface and said second sealing surface.

17. The noncontact isolation sealing assembly of claim 16 wherein the radial distance between said recess and said outside surface of said shaft is greater than the radial distance between said first and second sealing surfaces and said outside surface of said shaft.

18. The noncontact isolation sealing assembly of claim 15 wherein said first and second aperture of said first and second seal further comprises a first and second inside diameter.

19. The noncontact isolation sealing assembly of claim 18 wherein the radial distance between said first and second inside diameter and said outside surface of said shaft is less than 0.005 inches when said first and second inside diameter are concentric with said shaft.

20. The noncontact isolation sealing assembly of claim 15 wherein gas pressure in said gap region is maintained less than 10 pounds per square inch higher than gas pressure surrounding said shaft and said seal.

* * * * *